United States Patent

Sugiura et al.

[11] Patent Number: 4,565,171
[45] Date of Patent: Jan. 21, 1986

[54] KNOCK CONTROLLER FOR AN INTERNAL COMBUSTION ENGINE

[75] Inventors: Noboru Sugiura; Seiji Suda, both of Mito, Japan

[73] Assignee: Hitachi, Ltd., Tokyo, Japan

[21] Appl. No.: 506,870

[22] Filed: Jun. 22, 1983

[30] Foreign Application Priority Data

Jul. 5, 1982 [JP] Japan .................. 57-115379

[51] Int. Cl.⁴ .............................. F02P 5/14
[52] U.S. Cl. ........................ 123/425; 73/35
[58] Field of Search ............ 123/425, 435; 73/35

[56] References Cited

U.S. PATENT DOCUMENTS

| | | | |
|---|---|---|---|
| 4,282,841 | 8/1981 | Takagi et al. | 73/35 |
| 4,355,534 | 10/1982 | Roger | 73/35 |
| 4,366,792 | 1/1983 | Deleris | 123/425 |
| 4,370,964 | 2/1983 | Muranaka et al. | 123/425 |
| 4,413,599 | 11/1983 | Shigematsu et al. | 123/425 |

FOREIGN PATENT DOCUMENTS

| | | | |
|---|---|---|---|
| 0066661 | 5/1980 | Japan | 123/425 |
| 0108462 | 7/1982 | Japan | 123/425 |

Primary Examiner—Parshotam S. Lall
Attorney, Agent, or Firm—Antonelli, Terry & Wands

[57] ABSTRACT

In a knock controller for a multiple cylinder internal combustion engine, a single knock sensor is mounted on the engine to produce an electrical output, and an electronic control module receives the output and controls the ignition timing for respective cylinders at optimum angle positions with a processing unit, in which the ignition timing is determined by identifying each cylinder of the engine, determining respectively beforehand a knock detection level for each of the cylinders, detecting knocking in accordance with the respective knock detection level, and controlling the ignition timing for each of the cylinders according to the knocking detected according to the respective knock detection levels preset for each cylinder of the engine.

9 Claims, 12 Drawing Figures

| CYLINDER NO. | KNOCK PULSE REFERENCE VALUES $n(C_i)$ FOR CORRECTING VALUES FOR THE CYLINDERS |
|---|---|
| 1 | 1 |
| 2 | 2 |
| 3 | 3 |
| 4 | 1 |

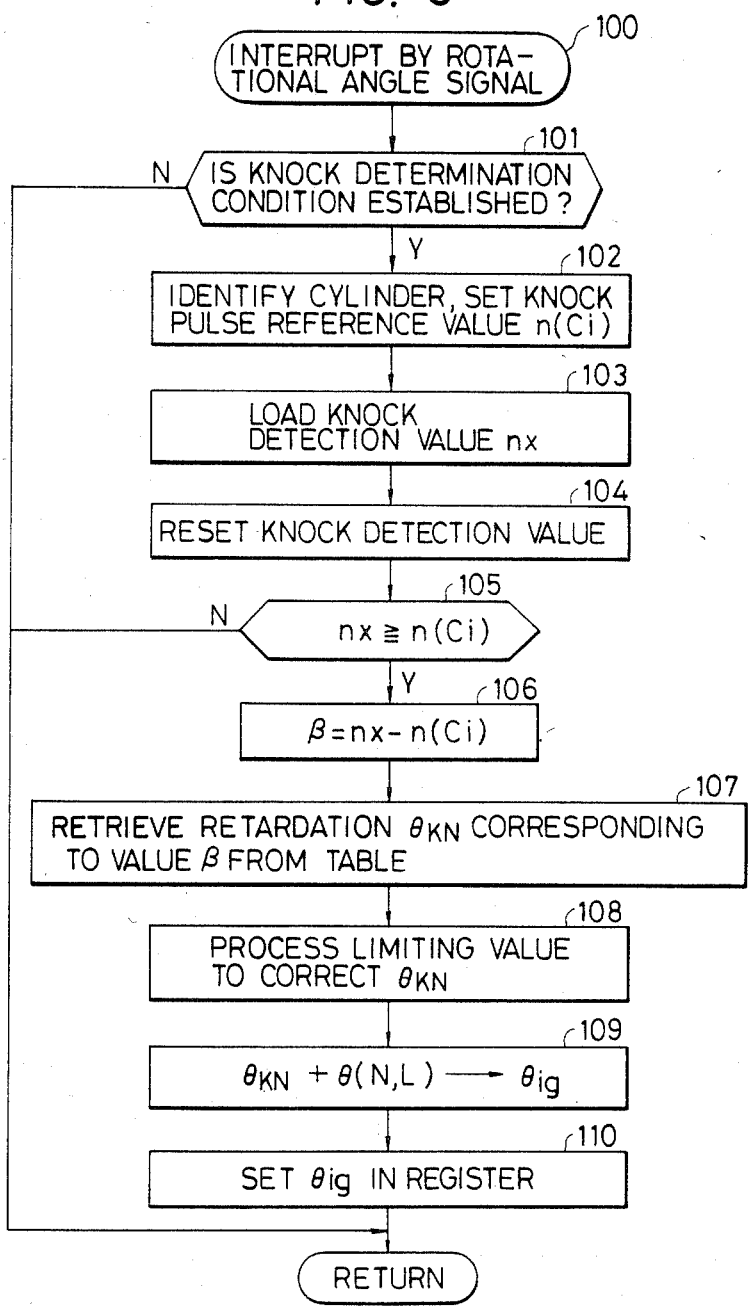

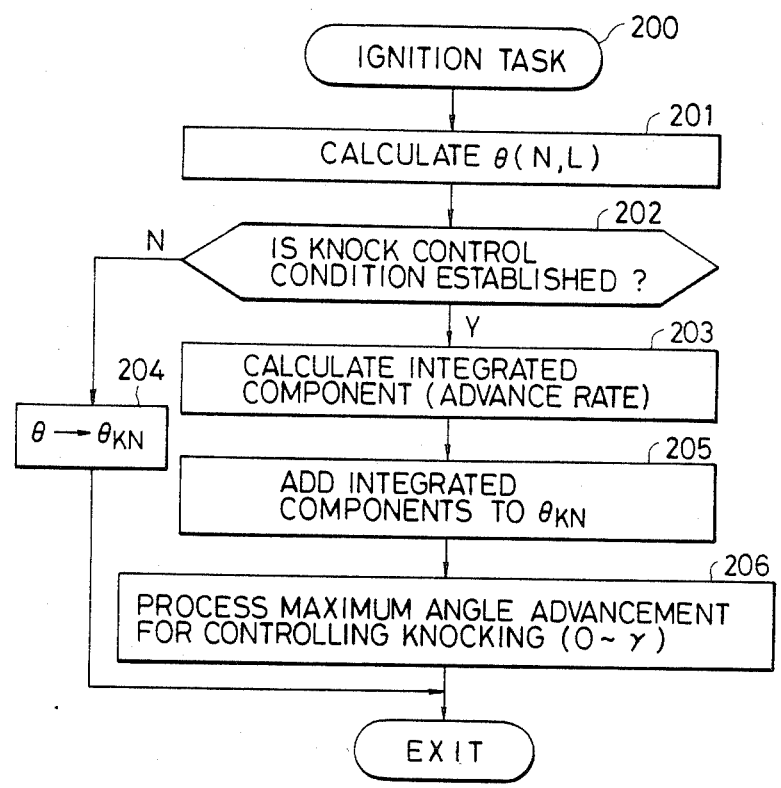

KNOCK CONTROLLER FOR AN INTERNAL COMBUSTION ENGINE

BACKGROUND OF THE INVENTION

The present invention relates to an electronic apparatus for controlling ignition timing of an internal combustion engine, and, more particularly, to a knock controller for counting the number of knock pulse signals when knocking has developed, and which controls the ignition timing for each of the cylinders depending on the counted value of the knock pulse signal.

In recent years, attempts have been made to burn a lean fuel mixture in order to reduce the consumption of fuel in the internal combustion engine. However, if the lean fuel mixture is burned in a conventional engine, the output of the engine decreases. Therefore, attempts have been made to increase the compression efficiency of the engine to increase the output per unit A/F, in order to increase the engine output. Knocking, however, develops easily with an increase in the compression ratio of the engine. Knocking, which develops in the engine, is accompanied by a knocking sound, a reduction in the running performance and a generation of a counter torque which reduces the engine output and causes the engine to overheat so that it could break down. Knocking has a close relationship to ignition timing, and it is known that the engine produces its maximum output when the ignition timing, i.e., the ignition angle, is set to the point just before that at which knocking develops. Reduction in the advance of the ignition angle to avoid the development of knocking results in a decrease in the engine output. It is therefore desired to advance the ignition timing to the point just before that at which knocking develops. In an engine which is equipped with a turbo-charger and, in particular, a logic having a high compression ratio, it is necessary to obtain the optimum ignition timings in order to maintain the maximum efficiency. Therefore, it is conventional practice to bring the ignition timing back to the point just before that at which knocking develops, if knocking has developed.

In, for example, a conventional knock controller in a four-cylinder engine with a single knock sensor being installed, the development of knocking is detected by detection signals produced by the knock sensor, and the ignition timing for all of the cylinders are controlled under the same conditions by the knock signals of the single knock sensor. However, knocking is not properly detected and controlled due to different degrees of knocking produced in each of the cylinders or due to differences in detecting knocking that result from the place at which the knock sensor is installed in the engine.

SUMMARY OF THE INVENTION

The object of the present invention is to provide a knock controller for an internal combustion engine, which is capable of maintaining the ignition timing at optimum positions for all the cylinders of an engine by installing a single knock sensor.

According to the present invention, the ignition timing are maintained at optimum positions for all the cylinders of the engine by identifying each cylinder of the engine, determining respectively beforehand a knock detection level for each of the cylinders, detecting knocking in answer to the respective knock detection level, and controlling the ignition timing for each of the cylinders according to the knocking detected according to the respective knock detection levels preset for every cylinders of the engine.

An embodiment of the present invention will be apparent from the following brief description of the drawings and the detailed description of the preferred embodiment.

BRIEF DESCRIPTION OF DRAWINGS

FIG. 5 is a flow chart for the knock control of the engine performed in accordance with the present invention; and FIG. 6 is a flow chart for the advance of the ignition timing angle performed in accordance with the present invention.

DETAILED DESCRIPTION OF THE PREFERRED EMBODIMENTS

Figure 1:
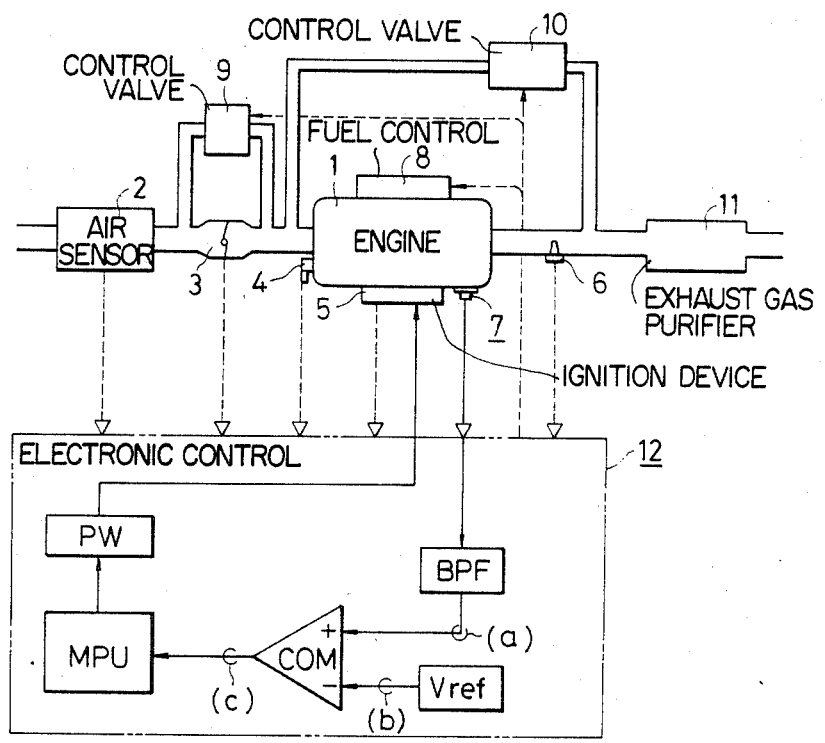
FIG. 1 is a schematic diagram showing the complete construction and system of an embodiment of the present invention.

Referring now to the drawings and, more particulary, FIG. 1, according to this figure an intake system of an internal combustion engine is equipped with a sensor 2 for detecting the quantity of intake air, a throttle valve 3 for adjusting the intake air rate, and a control valve 9 in a pipe that communicates the upstream side of the throttle valve with the downstream side thereof. The exhaust system is equipped with an exhaust gas purification unit 11 and a gas sensor 6 at a place on the upstream side of the exhaust gas purification unit 11. A part of the exhaust gas is returned to the intake system through a control valve 10. A cooling water temperature sensor 4, a knock sensor 7 for detecting the knocking as vibrations of the engine, a sensor 5 for detecting the rotational angle of the engine crank shaft and which also works as an ignition device, and a fuel control device 8 are installed on the engine 1. A module 12 receives signals from the above sensors and carries out calculations to actuate the fuel control device 8, the ignition device 5, and control valves 9 and 10 to operate the engine. The knock sensor 7 converts the vibrations of the engine into electrical signals which are then processed by a unit consisting of a band-pass filter BPF, a comparator COM and a reference signal generator Vref in the module 12. The signals are then processed by a main processing unit MPU to actuate a conventional ignition device, through a drive circuit PW, thereby controlling the ignition timing. The MPU includes a random access memory (RAM) for temporarily holding the data necessary to perform the processing therein, and a read only memory (ROM) in which is memorized data necessary to perform the process.

Figure 2:
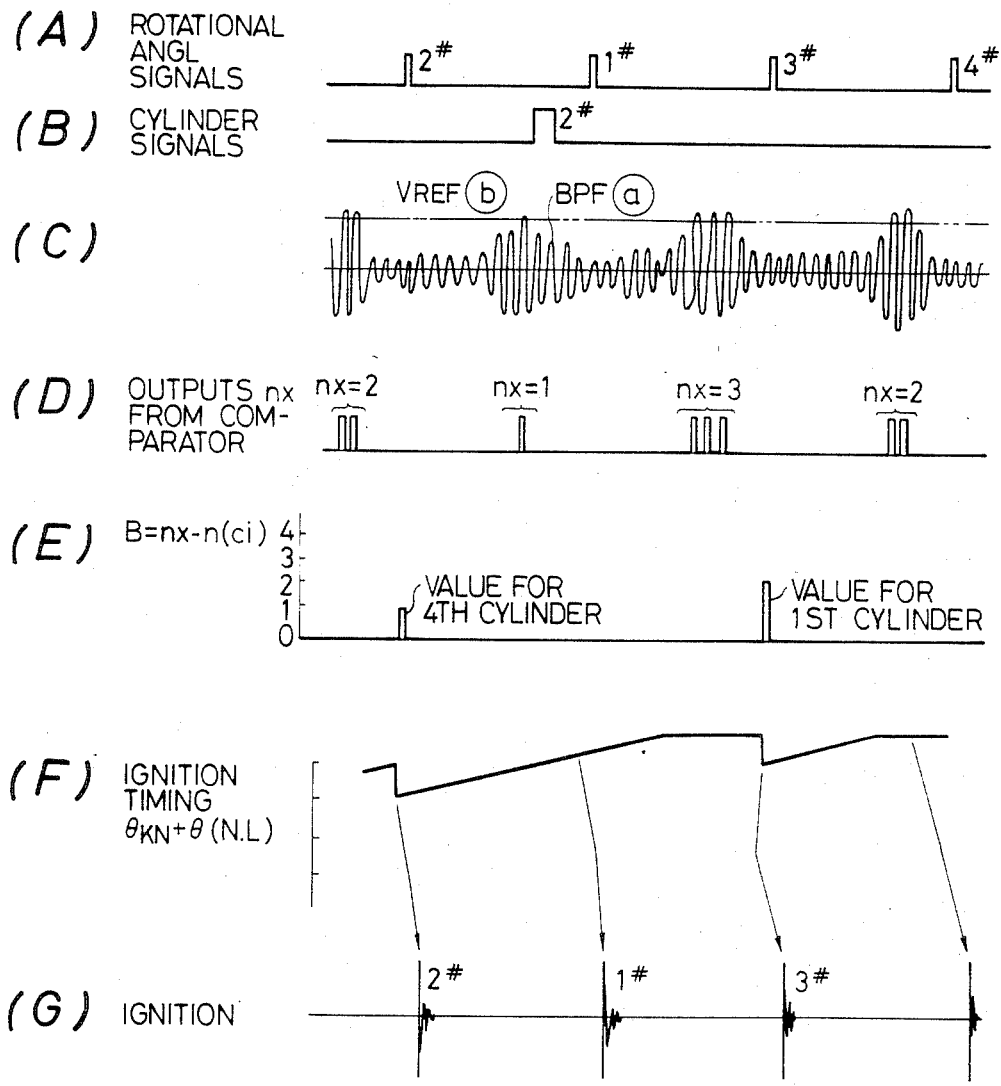
FIGS. 2A-2G are operation timing charts for the system shown in FIG. 1 performed in accordance with the present invention.

If an abnormal combustion takes place in a combustion chamber or cylinder of the engine, changes in the pressure become the amplitude of vibration waves which are transmitted to the knock sensor 7 and detected Output signals produced by the knock sensor 7 contain noise components so the band-pass filter BPF in the module 12 selectively identifies the frequency band specific to the knocking, and signals are produced as shown by ⓐ in FIG. 2 (C). The reference voltage generator Vref produces a constant voltage shown by ⓑ in FIG. 2(C). The output signals of the knock sensor 7 are compared with the reference voltage in the comparator COM to produce pulse signals shown in FIG. 2(D). The pulse signals are integrated for each of the cylinders according to signals shown in FIG. 2(B) identifying the cylinders. The rotational angle signals shown in FIG. 2(A) identify the number of the cylinder with reference to the cylinder signal shown in FIG. 2(B). Thus, the first rotational angle signal appearing after the cylinder signal is determined to be the signal representing the first cylinder, the second one for the third cylinder and the third one for the fourth and so on. After reference to a predetermined knock detection level (a sensitivity level determined by the number of integrated pulses determining the development of knocking), the integrated pulses are produced as knock signals for retarding the ignition timing as shown in FIG. 2(E). The retardation of the engine ignition timing is determined by the signals shown in FIG. 2(E), which is then reflected on the ignition timing as shown in FIG. 2(F), and the ignition is effected as shown in FIG. 2(G). The signals shown in FIG. 2(A) are rotational angle signals, i.e., interrupt signals produced for each of the cylinders.

Figures 3, 4:
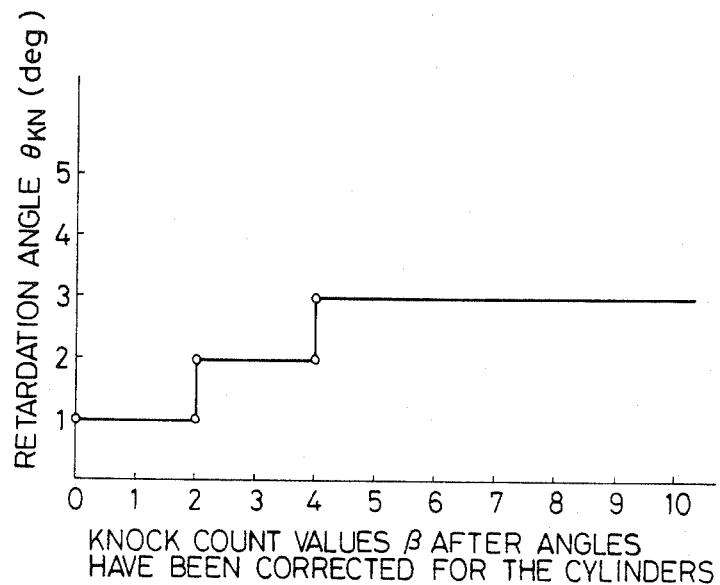
FIG. 3 is a table showing retardation relative to corrected knock counts.
FIG. 4 is a diagram showing correction levels for the cylinders of the engine.

FIG. 3 shows the retardation angle $\theta KN$ relative to knock signal counts $\beta$ after a correction has been effected for each of the cylinders. The retardation angle $\theta KN$ for the knock signal count $\beta$ is common for all cylinders, and the angle $\theta KN$ is retarded by 1 degree for the count two ($\beta=2$). Correction for the cylinders is effected as shown, for example, in FIG. 4. That is, a decision is rendered for the first cylinder that no knocking has developed when only one pulse signal shown in FIG. 2(D) is generated, and the decision that knocking has developed is rendered when two pulse signals are generated. A decision is rendered for the second cylinder that no knocking has developed when two or less pulse signals are generated, and ordinary knock control is performed when three or more pulse signals are produced. For the third cylinder, knock control is performed when four or more pulse signals are generated, and, for the fourth cylinder, the knock control is performed when two or more pulse signals are generated. Thus, the knock determination level is varied for each of the cylinders depending on the location of the cylinders with respect to the sensor 7. This is because, when only one knock sensor 7 is provided for the plural cylinders of the engine, large differences are developed in the outputs of the knock sensor 7 depending upon the mounting position, i.e., knocking developed in the cylinder positioned nearer to the knock sensor 7, can be easily detected, but the knocking in the cylinder far from the knock sensor 7 can barely be detected.

As shown in FIG. 5, when an interrupt due to the rotational angle signal is received at step 100, step 101 discriminates whether or not a knock determination condition is established, i.e., discriminates whether the temperature of the cooling water is higher than a predetermined value. When the step 101 discriminates that the knock determination condition is established, step 102 identifies the number of the cylinder and sets a knock pulse reference value n (Ci) corresponding to that cylinder to the value as shown in FIG. 4. When a knock pulse reference value is set by the step 102, step 103 loads a knock detection value nx. The knock detection value nx is the number of knock pulses actually counted by a counter in the MPU. Step 104 resets the knock detection value loaded, to prepare for counting the pulses for the next cylinder. The knock detection value nx loaded in the step 103 and the knock pulse reference value n(Ci) set in the step 102 are compared in step 105. That is, the step 105 determines whether nx is greater than n(Ci) (nx≧n(Ci)). When the knock detection value nx is determined to be greater than the knock pulse reference value n(Ci), it means that knocking has developed.

In step 106, a corrected knock count $\beta$ is calculated according to the relationship $\beta = nx - n(Ci)$ for each of the cylinders. When the value of $\beta$ is calculated, step 107 retrieves or reads from the table shown in FIG. 3, a retardation angle $\theta KN$, which varies in proportion to the value $\beta$. When the value $\theta KN$ is in excess of a certain limit, step 108 executes limit processing. As the retardation $\theta KN$ is determined relative to the knock count $\beta$, step 109 adds the retardation to a present ignition timing $\theta(N, L)$ ( determined by the running speed of the engine and the load ) to find the next ignition timing $\theta ig$. This ignition timing $\theta ig$ is set in a register in the next step 110.

As shown in FIG. 6, when the ignition task is started in step 200, step 201 calculates the ignition timing $\theta$ from the running speed of the engine and the load. Step 202 then determines whether the knock control condition has been established, i.e., determines whether the temperature of the cooling water is higher than a predetermined value. When it is determined that the knock control condition has been established, step 203 calculates the integrated component ( the advance rate ). When the step 202 determines that the knock control condition has not been established, step 204 passes on the ignition timing $\theta$ as a retardation angle $\theta KN$. When the step 203 has calculated the integrated component, step 205 adds the integrated components to the retardation angle $\theta KN$, and step 206 processes the maximum angle of advance to knocking control.

According to the present invention, the knock control for an ignition timing of the internal combustion engine can be achieved in an optimum manner for each of the cylinders simply by providing one knock sensor.

According to the present invention, no limitations are imposed on the positions for mounting the knock sensors, i.e., an increased degree of freedom can be obtained concerning the positions for mounting the sensor on the engine.

According to the present invention as explained above, the ignition timing can be maintained at their optimum angle positions for each of the cylinders of the engine.

What we claim:

1. A knock controller for controlling the ignition timing for a multiple cylinder internal combustion engine, comprising: sensor means for sensing operating conditions of the engine, said sensor means including a single knock sensor for sensing knocking developed in the cylinders of the engine and providing an output indicative thereof; ignition means for generating an ignition pulse and for producing sparks for each of the cylinders of the engine; and electronic control means for producing an ignition timing control signal to said ignition means for controlling the ignition timing in accordance with the intensity of detected knocking, said electronic control means identifying each of the plural cylinders of the engine in accordance with the operation of the engine, detecting the intensity of knocking developed in each of the identified plural cylinders according to the output of said knock sensor and different predetermined knock detection levels for the respective cylinders and providing an output indicative thereof, and determining the ignition timing for each of the identified plural cylinders according to the output of the detected knocking intensity for the identified cylinder, whereby the different predetermined knock detection levels for the respective cylinders are predetermined in accordance with at least the mounting position of the single knock sensor with respect to the respective cylinders thereby enabling mounting of the single knock sensor at any position on the engine and ensuring appropriate detection of knocking in each of the cylinders.

2. A knock controller according to claim 1, wherein the predetermined knock detection levels are different for at least two of the plural cylinders of the engine.

3. A knock controller according to claim 1, wherein said electronic control means includes memory means for storing the different predetermined knock detection levels for the respective cylinders and processing means for selecting the predetermined knock detection level for a respective identified cylinder and for detecting the intensity of knocking developed in the identified cylinder in accordance therewith and the output of the knock sensor.

4. A knock controller according to claim 1, wherein said sensor means further includes means for producing cylinder signals and means for producing rotational angle signals as interrupt signals in accordance with the operation of the engine, said electronic control means identifying a respective cylinder of the plural cylinders in accordance with the predetermined order of the rotational angle signals with reference to the cylinder signals.

5. A knock controller according to claim 1, wherein said electronic control means detects the knocking intensity in a respective cylinder by comparing the output of said knock sensor for a respective cylinder with a predetermined knock detection level associated with the respective identified cylinder and providing an output indicative of the comparison.

6. A knock controller according to claim 5, wherein said electronic control means further comprises means for comparing the output of said knock sensor to a predetermined reference voltage and producing a pulse signal representative of the knock detection value, means for selecting one of the different predetermined knock detection levels corresponding to the cylinder identified, and means for comparing the knock detection value with the selected predetermined level for providing an output signal indicative of the detected knock intensity developed in the identified cylinder.

7. A knock controller according to claim 6, wherein said electronic control means determines the ignition timing by selecting retardation data corresponding to the detected knock intensity signal for the identified cylinder and controlling the ignition means in accordance therewith.

8. A knock controller according to claim 7, wherein said electronic control means determines the ignition timing in accordance with detected knock intensity signal by calculating the ignition timing from data indicative of the running speed of the engine and the load thereof, and correcting the calculated ignition timing data by the selected retardation data corresponding to the detected knock intensity signal.

9. A knock controller according to claim 8, wherein said electronic control means determines the ignition timing by setting the calculated ignition timing from the running speed of the engine and the load thereof when knocking is not detected.

* * * * *